(12) United States Patent
Ramesh et al.

(10) Patent No.: US 6,673,412 B2
(45) Date of Patent: Jan. 6, 2004

(54) COMPOSITE MATERIALS CONTAINING A METALLIC LAYER AND METHODS FOR PRODUCING SAME

(75) Inventors: Natarajan S. Ramesh, Grapevine, TX (US); Nelson Malwitz, Brookfield, CT (US)

(73) Assignee: Sealed Air Corporation, Duncan, SC (US)

( * ) Notice: Subject to any disclaimer, the term of this patent is extended or adjusted under 35 U.S.C. 154(b) by 101 days.

(21) Appl. No.: 09/811,681

(22) Filed: Mar. 19, 2001

(65) Prior Publication Data
US 2003/0021979 A1 Jan. 30, 2003

(51) Int. Cl.[7] .............................. B32B 3/14; B32B 27/32
(52) U.S. Cl. ..................... 428/77; 428/213; 428/317.1; 428/317.7; 428/318.6; 428/319.9; 428/462
(58) Field of Search ..................... 428/77, 213, 317.1, 428/317.7, 318.6, 319.9, 462

(56) References Cited

U.S. PATENT DOCUMENTS

| | | | | |
|---|---|---|---|---|
| 4,729,179 A | * | 3/1988 | Quist, Jr. ..................... 36/44 |
| 5,316,835 A | | 5/1994 | Groft et al. ................. 428/247 |
| 5,348,984 A | | 9/1994 | Lee .............................. 521/79 |
| 5,462,974 A | | 10/1995 | Lee .............................. 521/79 |
| 5,667,728 A | | 9/1997 | Lee ............................ 252/350 |
| 5,952,076 A | | 9/1999 | Foster ........................ 428/77 |
| 5,968,630 A | | 10/1999 | Foster ........................ 428/77 |

* cited by examiner

Primary Examiner—Samuel A. Acquah
(74) Attorney, Agent, or Firm—Woodcock Washburn LLP

(57) ABSTRACT

A composite material having a film operatively associated with a polyolefin foam layer and at least one metallic layer operatively associated with at least one of the foam layer and the film.

28 Claims, 5 Drawing Sheets

COMPOSITE MATERIALS CONTAINING A METALLIC LAYER AND METHODS FOR PRODUCING SAME

FIELD OF THE INVENTION

The present invention is directed to polyolefin composite materials and methods for producing the same. More specifically, this invention relates to polyolefin composite materials containing a metallic layer that are useful as flooring underlayments for laminate floors, and methods for producing the same.

BACKGROUND OF THE INVENTION

Laminate floors are relatively new flooring materials that may be used in place of more traditional materials, such as wood, tile, or vinyl, but are typically constructed to resemble either wood or tile. Laminate floors generally comprise two or more layers, including a top or surface layer and a core layer. The surface layer is a protective, wear-resistant layer which may contain aluminum oxide particles or other materials that form a hard, durable surface. The core layer to which the surface layer is bonded may comprise high density fiberboard. This wood-based material may include a tongue-and-groove design to allow pieces of the flooring to be bonded together with an adhesive. The laminate may also include a bottom layer to help balance the flooring and add strength.

Laminate floors are commercially available from various manufacturers in the flooring business, and are designed to be installed as a floating floor, i.e., not nailed or glued to the subfloor. Instead, the flooring is applied over a floor "underlayment," which is typically a thin layer of polyethylene foam (e.g., less than 0.1 inch), to provide cushioning and sound reduction. When laminate flooring is applied on a concrete sub-floor, it is important that the underlayment also provide a barrier to the passage of water vapor therethrough so that water vapor from the concrete subfloor does not cause the core/fiberboard layer of the laminate floor to deteriorate from rotting. While polyethylene (PE) foam provides cushioning and sound reduction, it is an inadequate barrier to the passage of water vapor as shown by its high water vapor transmission rates (WVTR). Further, while many laminate flooring materials include a bottom layer, this layer generally does not provide a barrier to the passage of water vapor.

It has previously been proposed to adhere a sheet of polyethylene film to a sheet of polyethylene foam in order to provide a composite structure having a lower WVTR than a sheet of polyethylene foam alone. Although WVTRs of about 0.6 grams/100 in$^2$ per 24 hours (measured at 100° F. and 90% relative humidity) or less can be obtained using polyethylene foam/film composites, there is a continued need for floor underlayments having even lower WVTRs. In addition, it would be desirable to achieve lower WVTRs with thinner films, thereby using less resin to make the film and, as a result, reducing the cost of the floor underlayment composite.

Further, conventional polyethylene foam/film underlayments are torn and punctured too easily in the tough building construction environments where they are utilized, thereby compromising the integrity of the water vapor barrier that the PE film is otherwise intended to provide. Underlayments composites with increased tensile strength and tear initiation resistance of the film component of conventional underlayment composites would have a beneficial impact on the abuse- and tear-resistance of the underlayment material.

In light of the foregoing, there is a continued need in the art for improved composite materials that are useful as flooring underlayments for laminate floors and methods for making the same. The composite materials should provide a combination of good vapor barrier and mechanical properties. The composite materials should also be economical to manufacture. In addition, the composite materials should provide good acoustic and thermal insulation properties.

SUMMARY

The present invention provides composite materials that are useful as flooring underlayments, and methods of producing the same. The composite materials of the present invention provide improved moisture barrier properties, such as very low water vapor transmission rates, as compared to conventional composite materials. The composite materials of the present invention also provide good acoustic and thermal insulation properties as compared to conventional composites. In addition, the composite materials of the present invention have improved mechanical properties, including tensile strength, reflectivity, and emissivity.

In one of its aspects, the present invention relates to composite materials having a film operatively associated with a polyolefin foam layer and at least one metallic layer operatively associated with at least one of the foam layer and the film. In one embodiment, the metallic layer is a metallized film. In another embodiment, the metallic layer is a foil laminate. The foil laminate optionally has a multilayer structure. The metallic layer is optionally coated with a corrosion resistant coating. The metallic layer can also contain one or more corrosion resistant additives. The metallic layer can be positioned generally adjacent to the foam layer and/or the film. In particular, the metallic layer can be heat laminated or bonded to either one or both of the foam layer and the film.

In another of its aspects, the present invention relates a composite flooring materials having a first film adhered to a first surface of a foam layer, a second film adhered to a second surface of the foam layer, and a metallic layer operatively associated with at least one of the foam layer, the first film, and the second film.

In still another of its aspects, the present invention relates to composite flooring materials having a metallic layer operatively associated with a foam layer. At least one edge of the metallic layer extends beyond a corresponding edge of the foam layer. In one embodiment, the metallic layer is coated with a corrosion resistant coating. In another embodiment, the metallic layer contains one or more corrosion resistant additives.

In still another of its aspects, the present invention relates to methods for making composite materials wherein a film is operatively associated with a surface of a foam layer such that at least one edge of the film extends beyond a corresponding edge of the foam layer. A metallic layer is operatively associated with at least one of the film and the foam layer. The metallic layer can be positioned generally adjacent to the foam layer and/or the film. In particular, the metallic layer can be heat laminated or bonded to either one or both of the foam layer and the film.

BRIEF DESCRIPTION OF THE DRAWINGS

The numerous objects and advantages of the present invention may be better understood by those skilled in the art by reference to the accompanying detailed description and the following drawings, in which.

DETAILED DESCRIPTION OF THE INVENTION

Figure 1:
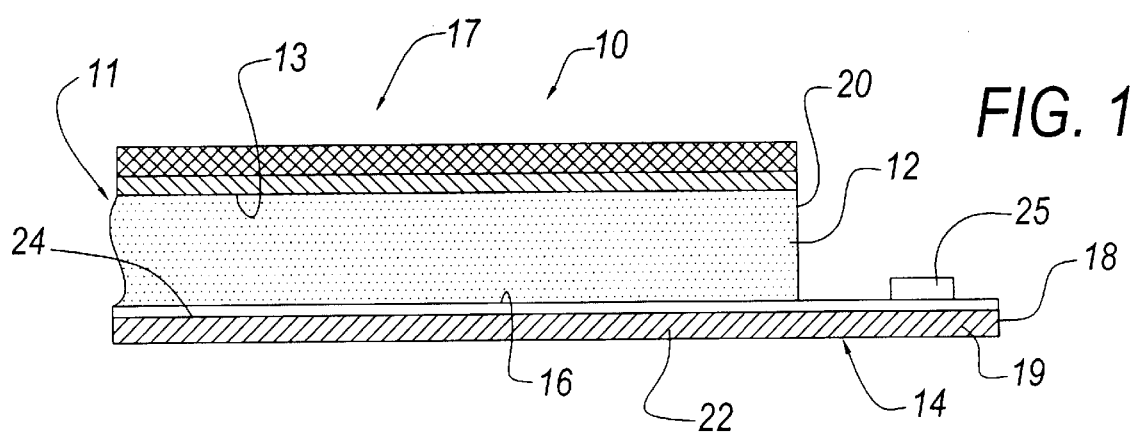
FIG. 1 is an elevational, cross-sectional view of a composite material in accordance with the present invention.

A composite material 10 in accordance with the present invention is depicted in FIG. 1. The composite material includes a foam layer or sheet 12 comprising polyolefin, a first film 11 adhered to a first surface 13 of the foam layer 12, a second film 14 adhered to a second surface 16 of the foam layer 12, and a metallic layer 17 adhered to a surface of the first film 11. Second film 14 has a larger surface area than the foam layer 12 such that at least one edge 18 of the second film 14 extends beyond a corresponding edge 20 of foam layer 12. In this manner, second film 14 has an extended region 19 that extends beyond edge 20 of foam layer 12. The extended region 19 enables sections of the composite material to be placed adjacent to one another to provide a continuous water vapor barrier, as described in detail below.

Polyolefin foam layer 12 preferably comprises polyethylene homopolymer or copolymer. Polyolefin foams, particularly polyethylene (PE) foams, and methods for manufacturing such foams are well known in the art. See, e.g., U.S. Pat. Nos. 5,348,984 (Lee), 5,462,974 (Lee), and 5,667,728 (Lee), the disclosures of which are incorporated herein by reference thereto. Examples of useful polyethylene homopolymers include low density polyethylene (LDPE) and high density polyethylene (HDPE). Polyethylene copolymers may include, e.g., homogeneous ethylene/alpha-olefin copolymers (i.e., metallocene/single-site catalyzed copolymers of ethylene and, e.g., one or more $C_3$ to $C_{10}$ alpha-olefin comonomers) or heterogeneous (i.e., Ziegler-Natta catalyzed) ethylene/alpha-olefin copolymers. A preferred polyethylene is low density polyethylene (LDPE) having a melt flow index ranging from about 1 to about 40 and a density ranging from about 0.915 g/cc to about 0.930 g/cc.

If desired or necessary, various additives may also be included with the polyolefin. For example, it may be desirable to include a nucleating agent (e.g., zinc oxide, zirconium oxide, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

Foam layer 12 may have any desired thickness to suit the intended application as a floor underlayment, preferably ranging, e.g., from about 0.004 to about 2 inches, more preferably from about 0.01 to about 1 inch, and most preferably from about 0.05 to about 0.5 inch. The foam may have any desired density, ranging, e.g., from about 1 to about 10 pounds/ft$^3$. The density preferably ranges from about 1 to about 7 pounds/ft$^3$ and, more preferably, from about 1.5 to about 4 pounds/ft$^3$. The foam layer 12 preferably has at least about 70% closed cells, more preferably about 80% closed cells and, most preferably, at least about 90% closed cells. When the foam layer 12 is to be laminated to first film 11, for example, foam layer 12 is preferably perforated or substantially completely cured prior to lamination, so that substantially no residual blowing agent is present in the foam layer 12.

Any conventional chemical or physical blowing agents may be used to produce the foam layer 12. When used, the blowing agent is preferably a physical blowing agent such as carbon dioxide, ethane, propane, n-butane, isobutane, pentane, hexane, butadiene, acetone, methylene chloride, any of the chlorofluorocarbons, hydrochlorofluorocarbons, or hydrofluorocarbons, as well as mixtures thereof. The blowing agent may be mixed with the polyolefin in any desired amount to achieve a desired degree of expansion in the resultant foam. Generally, the blowing agent may be added to the polyolefin in an amount ranging from about 0.5 to about 80 parts by weight, based on 100 parts by weight of the polyolefin. More preferably, the blowing agent is present at an amount ranging from about 1 to about 30 and, most preferably, from about 3 to about 15 parts per 100 parts by weight of the polyolefin.

In one embodiment, the foam layer 12 is produced by an extrusion process. For example, the polyolefin can be added to an extruder, preferably in the form of resin pellets. Any conventional type of extruder may be used, e.g., single screw, double screw, and/or tandem extruders. In the extruder, the resin pellets are melted and mixed. A blowing agent is preferably added to the melted polyolefin via one or more injection ports in the extruder. Any optional additives that are used may be added to the melted polyolefin in the extruder and/or may be added with the resin pellets. The extruder pushes the entire melt mixture (melted polyolefin, blowing agent, and any optional additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to nucleate and expand into a plurality of cells that solidify upon cooling of the polymer mass (due to the reduction in temperature), thereby trapping the blowing agent within the cells.

Although the first film sheet 11 can comprise any of a variety of film materials, the first film sheet 11 preferably comprises a polyolefin. Suitable polyolefins include, but are not limited to, low density polyethylenes, metallocene based polyethylenes, medium density polyethylenes, high density polyethylenes, and polypropylenes (e.g., biaxially oriented polypropylenes), polyesters, ethyvinyl alcohols (EVA), polyvinylidene chloride (PVDC), and blends thereof. Various polypropylenes are suitable for first film sheet 11, including atactic, isotactic, syndiotactic, long-chain branched, and propylene/ethylene copolymers.

Preferably, first film sheet 11 is as thin as possible, in order to minimize the amount of resin necessary to produce the film, while providing an acceptably low WVTR for floor underlayment applications. Thus, the first film sheet 11 preferably has a thickness of not more than about 0.001 inches, and more preferably of between about 0.0003 and about 0.00075 inches. It will be appreciated, however, that first film sheet 11 can have a thickness of about 0.001 inches or more when minimizing the amount of resin is not an issue, or when the situation otherwise warrants it.

The second film sheet 14 can also comprise any of a variety of film materials. However, the second film sheet 14 preferably comprises a polyolefin and, more preferably, a low density polyethylene. Second film sheet 14 preferably has a thickness of between about 0.001 inches and about 0.008 inches. More preferably, second film sheet 14 has a thickness of between about 0.002 inches and about 0.005 inches.

When the first and/or second film sheets, 11 and 14, comprise polypropylene, the manufacture of the film sheets may be generally accomplished by extruding polypropylene and optionally other resinous materials, which have been heated to their flow or melting point, from an extrusion die in tubular or planar form. After extrusion, or coextrusion where either of the film sheets are a multilayer film, the extrudate is preferably cooled by quenching.

After quenching, the first and/or second film sheets, 11 and 14, are optionally stretch oriented. The term "stretch-oriented" is used herein to describe the process and resultant product characteristics obtained by stretching and immediately cooling a resinous polymeric material which has been heated to its orientation temperature so as to revise the molecular configuration of the material by physical alignment of the molecules to improve certain mechanical properties of the film such as, for example, tensile strength and tear strength, as well as the optical properties of the film. Importantly, in the context of the present invention, stretch-orientation decreases the WVTR of a film, i.e., improves the water vapor barrier functionality of the film, and also increases the toughness of the film in comparison to films that are not stretch-oriented.

The first and/or second film sheets, 11 and 14, are optionally stretch-oriented by reheating the quenched film sheet to its orientation temperature and then stretching the film. The orientation temperature for a given film will vary with the different resinous polymers and blends thereof which comprise the film, and will generally be a range of temperatures based on such factors. In general, the orientation temperature may be stated to be above room temperature and below the melting point of the film, and will typically be at or near the glass transition temperature of the resins from which the film is made.

The process of stretching a film at its orientation temperature range may be accomplished in a number of ways such as, e.g., by "blown bubble" or "tenter framing" techniques. These and other techniques are well known in the art and involve stretching the film in the cross or transverse direction (TD) and/or in the longitudinal or machine direction (MD). When the stretching force is applied in one direction, uniaxial orientation results. When the stretching force is applied in two directions, biaxial orientation results. After being stretched, the film is rapidly cooled to quench and thus set or locked-in the oriented molecular configuration. Such an oriented and quenched film is said to be "heat-shrinkable," i.e., without heat-setting as described immediately below, the film will tend to return toward its original, unoriented (unstretched) dimensions when subsequently heated to an appropriate temperature below its melting temperature range.

After locking-in the oriented molecular configuration by quenching, first and/or second film sheets, 11 and 14, are preferably heat-set by bringing the oriented film to a temperature near its orientation temperature while restraining the film in its stretched dimensions. This process, which is also know as "annealing," produces a film with substantially less shrinkability, while retaining much of the advantages of orientation, including improved tensile strength and optical properties, as well as lower WVTR.

First and/or second film sheets, 11 and 14, are preferably stretch-oriented in at least two directions, i.e., "biaxially oriented," preferably in both the machine direction and transverse direction. Further, the first and/or second film sheets preferably have an orientation ratio of at least about 2 in both of the directions in which they have been oriented; more preferably at least about 3, even more preferably at least about 4 and, most preferably, an orientation ratio of at least about 5 in both directions. As used herein, the phrase "orientation ratio" refers to the multiplication product of the extent to which a film is expanded in any one direction during the orientation process. Thus, an orientation ratio of, e.g., 2 in the machine direction, indicates that the film has been expanded to twice its original dimension in the machine direction of the film. When a film is biaxially oriented, the orientation ratios are conventionally expressed as "[machine direction (MD) ratio]×[transverse direction (TD) ratio]" or "[TD ratio]×[MD ratio]," however designated. Thus, a biaxial orientation ratio of 2 in the MD and 3 in the TD would be expressed as a "MD×TD orientation ratio of 2×3."

The foam layer 12 and the first and/or second films, 11 and 14, are operatively associated with each other by any of a variety of techniques. In one embodiment, the layers are heat laminated together at a suitable temperature. Alternatively, the layers are bonded together using, for example, chemical adhesives. To facilitate bonding between the foam layer 12 and the first and/or second film sheets, 11 and 14, such as when the foam layer 12 and the film sheets are comprised of chemically dissimilar materials that do not bond well to one another, a bonding layer is optionally interposed between the foam layer 12 and the first and/or second film sheet, 11 and 14. Toward that end, the first and/or second film sheets, 11 and 14, optionally comprise a film layer 22 and a bonding layer 24. In one embodiment, the film layer 22 and the bonding layer 24 are integrally formed.

Suitable materials from which the bonding layer 24 may be constructed include propylene/ethylene copolymers, ethylene-propylene terpolymers (e.g., EPDM), ethylene-butylene random copolymers, polyethylenes ranging in density from about 0.91 to about 0.96 g/cc, metallocene-catalyzed plastomers and elastomers, ultra low density ethylene/octene copolymers (ranging in density from about 0.88 to about 0.913 g/cc), ionomers, natural rubbers, styrene-butadine-stryrene copolymers, styrene-isoprene-styrene copolymers, acrylics, ethylene/vinyl acetate copolymers, ethylene/vinyl alcohol copolymers, flourinated ethylene-propylene copolymers, elastomeric copolymers of ethylene and propylene (e.g., EPR), butyl rubbers, ABS, chlorinated polyethylenes, PVDC, ACS acrylonitrile-chlorinated polyethylenes, and HIPS (high impact polystyrenes).

Alternatively, the bonding layer 24 may comprise a reactively modified surface produced on the first and/or second film sheets, 11 and 14, by a suitable means. A "reactively modified surface" is a film surface that has been chemically altered in order to incorporate reactive species onto such film surface in order to improve the ability of such surface to be adhered to another material. Specific examples of reactive surface modification include corona treatment, plasma (ionized gas) treatment, flame treatment, and chemical treatments. As a further alternative, the bonding layer 24 may comprise a combination of the foregoing bonding means, i.e., the bonding layer 24 may comprise one of the bonding materials set forth above with the surface of such layer that is to be in contact with the foam layer 12 having a reactively modified surface thereon.

A less preferred alternative is to bond the first and/or second film sheets, 11 and 14, and foam layer 12 together via adhesive lamination, e.g., wherein the bonding layer comprises a pressure-sensitive adhesive or a thermoset adhesive such as a polyurethane adhesive.

An adhesive 25 is optionally positioned along the extended region 19 of the second film sheet 14. In one embodiment, the adhesive 25 is formed as an adhesive layer along at least a portion of the extended region 19 of the second film sheet 14. A release layer is optionally positioned over the adhesive 25 to maintain the integrity of the adhesive until a time just prior to use.

The metallic layer 17 comprises any of a variety of metals. However, the metallic layer 17 is preferably formed from a metal that is not easily oxidized or corroded. For example, the metallic layer 17 can be a layer comprising aluminum or aluminum alloys. Further, the metallic layer 17 optionally comprises a corrosion resistant coating or additive. In order to obtain the good combination of properties of the present invention, the metallic layer 17 preferably has a thickness of between about 0.0005 and about 0.020 inches, and more preferably between about 0.002 and about 0.006 inches.

In the embodiment depicted in FIG. 1, the metallic layer 17 comprises a metallized film. Metallized films can be prepared using standard techniques to deposit metal onto one or both sides of a polymeric film. Preferably, the metal is applied to a thickness of between about 100 Å and about 700 Å, or more. Increasing the thickness of the metal is expected to improve the moisture barrier properties of the resulting composite material 10. For example, aluminum and/or other metals can be vacuum deposited onto polyesters, polypropylenes, ethylene-vinyl acetate copolymers (EVA), polyvinyl chlorides (PVC), polyvinyl fluorides (PVF), polyolefins in general, nylons, or synthetic or natural non-woven materials. The polymeric film optionally comprises a multilayer structure. In particular, the polymeric film may comprise a seal layer to facilitate bonding or lamination of the metallic layer to the first film 11. Suitable seal layers include, but are not limited to, ethyvinyl alcohols (EVA), linear low density polyethylene (LLDPE), metallocene-catalyzed polyethylenes, high density polyethylenes (HDPE), low density polyethylenes (LDPE), and blends thereof.

Alternatively, the metallic layer 17 comprises a foil laminate. The foil laminate is formed as a multilayer structure comprising a metal foil. A first coating is optionally applied to a first surface of the metal foil and a second coating is optionally applied to a second surface of the metal foil. Suitable coating materials include, but are not limited to, polyolefins (e.g., low density polyethylenes), ethylene-vinyl acetate copolymers (EVA), polyesters, polyamides, polyethers, polycarbonates, polyurethanes, polysulfides, vinyl polymers, poly (ethylene terephthalate) (PET), or blends thereof. The first and second coatings are applied to the metal foil using any of a variety of techniques. For example, the coatings can be applied to the metal foil using a combination of blown film and extrusion lamination processes. The coatings preferably have a thickness of between about 0.0005 inches and about 0.008 inches, and more preferably of between about 0.002 inches and about 0.005 inches.

The metallic layer 17 can be operatively associated with the first film 11 by any of a variety of techniques. In one embodiment, the metallic layer 17 is heat laminated to the first film 11 at a suitable temperature (e.g., about 380° F.). Alternatively, the metallic layer 17 is bonded to the first film 11 using, for example, chemical adhesives. Suitable adhesives include, but are not limited to, organic solvent based adhesives, epoxy based adhesives, and water based adhesives.

Figure 2:
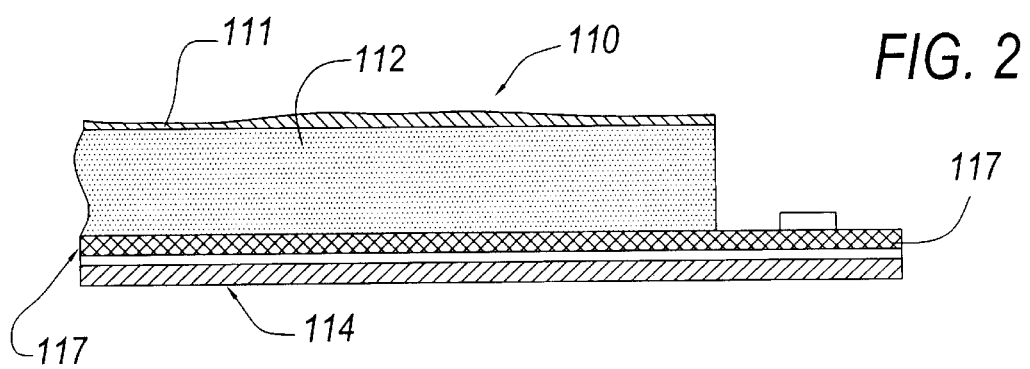
FIG. 2 is an elevational, cross-sectional view of another embodiment of a composite material in accordance with the present invention.

An alternate embodiment of the composite materials of the present invention is depicted in FIG. 2. The composite material 110 of FIG. 2 comprises s film 111, a foam layer 112, a metallic layer 117, and an optional film 114 which are in many respects similar to the film layer 11, foam layer 12, the metallic layer 17, and the second film 14, respectively, described in connection with the embodiment of FIG. 1. However, in the composite material 110 of FIG. 2, the metallic layer 117 is positioned between the foam layer 112 and the film 114. Further, both the metallic layer 117 and the optional film 114 each have at least one edge that extends beyond a corresponding edge of the foam layer 112.

Figure 3:
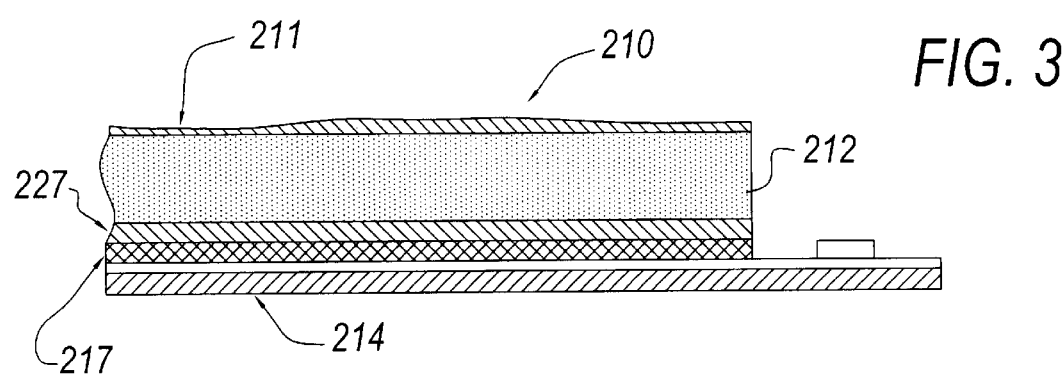
FIG. 3 is an elevational, cross-sectional view of yet another embodiment of a composite material in accordance with the present invention.

Referring now to FIG. 3, yet another embodiment of the composite material of the present invention is shown. The composite material 210 of FIG. 3 comprises a first film 211, a foam layer 212, a second film 214, and an optionally coated metallic layer 217 which are essentially identical to the first film 11, the foam layer 12, the second film 14, and the optionally coated metallic layer 17 described in connection with the embodiment of FIG. 1. However, in the embodiment of FIG. 3, the coated metallic layer 217 is adhered to the second film 214. Further, a third film 227 is provided which is positioned between the coated metallic layer 217 and the foam layer 212. In one particular embodiment, the first film 211 comprises a high density polyethylene foam (HDPE), the foam layer 212 comprises a polyethylene foam having a density of between about 2 to about 9 pounds/ft$^3$, and the second film 214 comprises an ethylene-vinyl acetate copolymer (EVA) or a low density polyethylene (LDPE). The third film 227 is prepared from any of a variety of materials depending upon the specific properties which the composite material is intended to impart. For example, the third film 227 can comprise a biaxially-oriented polypropylene (BOPP) to provide the composite material 210 with a sufficient degree of stiffness to facilitate handling of the composite material, and to act as an additional moisture barrier. Alternatively, the third film 227 can comprise poly (ethylene terphthalate) (PET) to provide the composite material 210 with enhanced stiffness. The third film 227 preferably has a thickness of between about 0.0005 inches about 0.004 inches, and more preferably of between about 0.001 inches and about 0.003 inches. In a preferred embodiment, the second film 214, coated metallic layer 217, and third film 227 have a combined thickness of between about 0.002 and about 0.005 inches.

Figure 4:
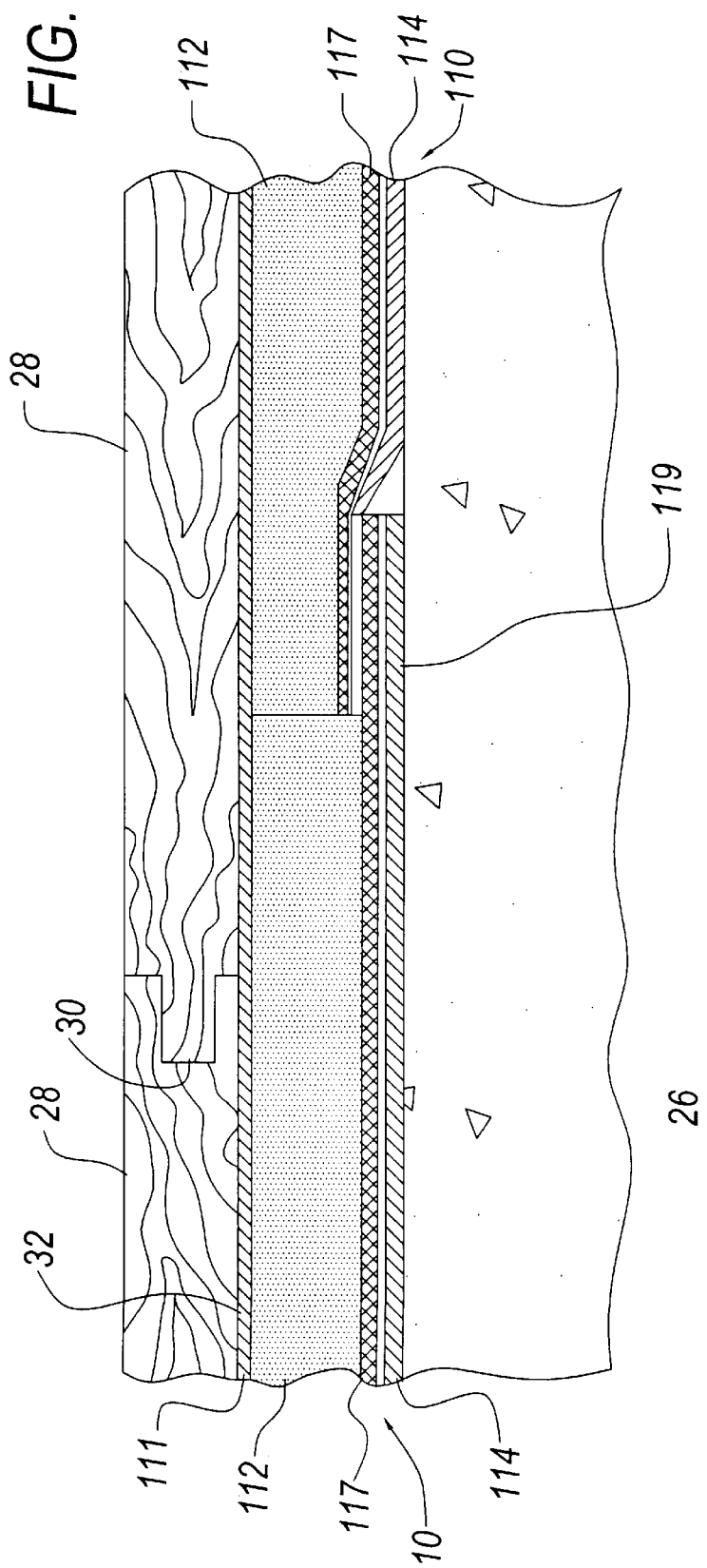
FIG. 4 is an elevational, cross-sectional view of the composite material of FIG. 2 used as a floor underlayment.

The use of the composite material 110, depicted in FIG. 2, as a floor underlayment for a laminate floor is shown schematically in FIG. 4. As shown, composite material 110 is positioned on concrete subflooring 26 in a free-lying manner, i.e., not adhered to the subflooring. Composite material 110 is in the form of strips, with two adjacent strips being shown in FIG. 4. Second film 114 contacts the top surface of concrete subflooring 26. Planks of laminate flooring 28, which preferably have the appearance of natural wood flooring, are positioned on composite material 110 in a free-lying manner. Planks 28 fit together by means of tongue-in-groove arrangement 30 and are preferably glued together (glue not shown). The first film 111 contacts the bottom surface 32 of laminate flooring planks 28.

FIG. 4 shows that the extended region 119 of second film 114 and the metallic layer 117 of one strip of composite material 110 underlies the adjacent strip of composite material 110. In this manner, second film 114 and metallic layer 117 provide a continuous vapor barrier across the entire surface of concrete subflooring 26, i.e., without any gaps as would otherwise occur at the intersection of adjacent strips of the composite structure, thereby protecting the laminate flooring 28 from damage due to exposure to water vapor. The strip of composite material 110 which has its extended region 119 against a wall can be, for example, trimmed, cut to fit, or tucked between the composite material 110 and the concrete subflooring 26. As an alternative, composite material 110 can be installed so that second film 114 contacts laminate flooring 28 and the first film 111 contacts concrete subflooring 26.

Figure 5:
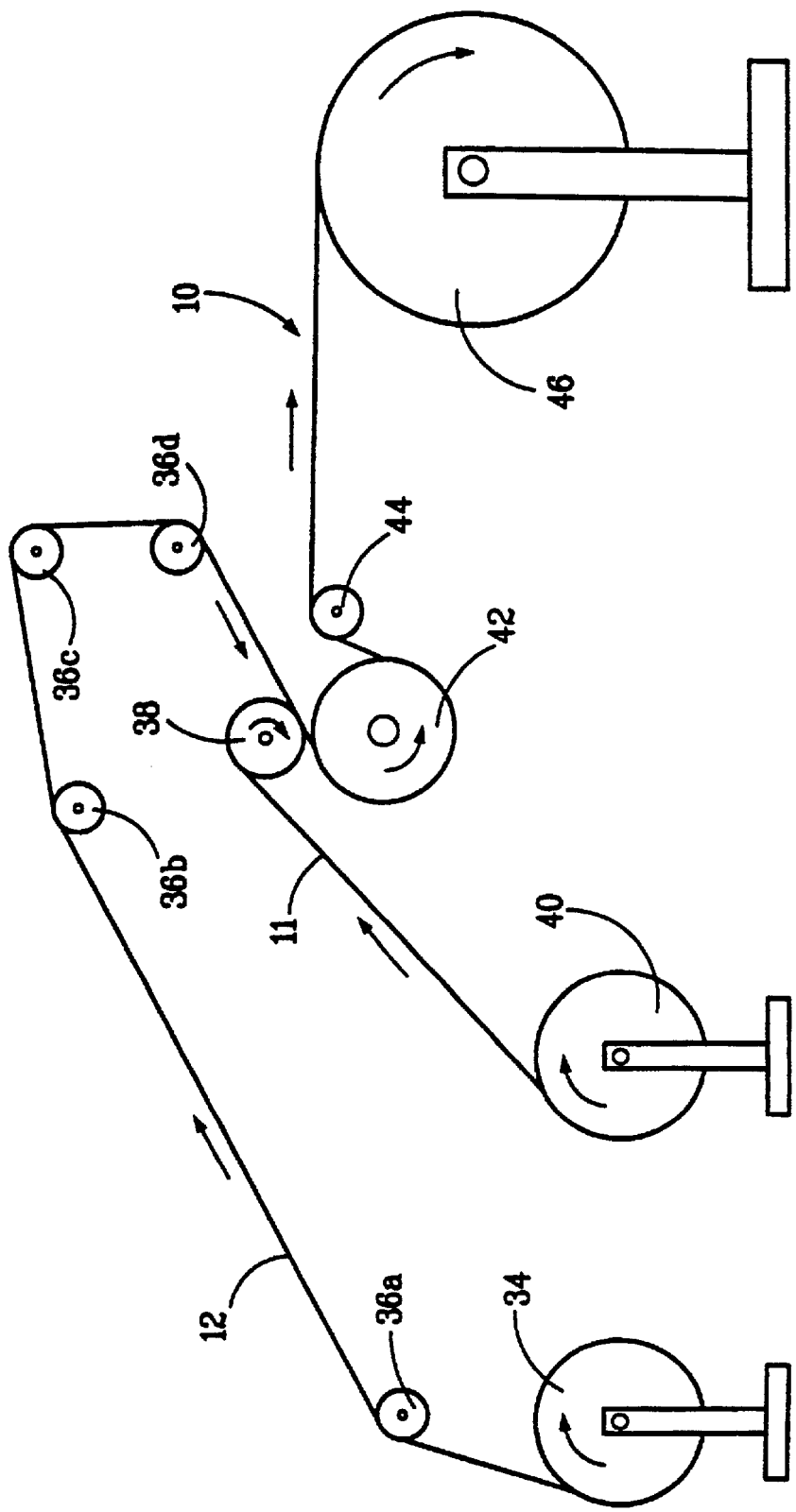
FIG. 5 is a schematic view of a preferred process for making the composite materials of the present invention.

Having now described composite structures in accordance with the invention, a preferred method for making composite structure 10 will be discussed with reference to FIG. 5, which illustrates a method for adhering the first film 11, the second film 14, and the metallic layer 17 to the foam sheet 12 via heat lamination. Foam sheet 12 is unwound from storage roll 34 and sent via guide rollers 36a–d to hot roller 38. Simultaneously, first film sheet 11 is unwound from storage roll 40, wrapped around hot roller 38 to heat the film, then brought into contact with foam sheet 12 between hot roller 38 and contact roller 42. The lamination process is completed by squeezing the foam/film composite between contact roller 42 and chill roller 44, which both presses the film and foam together sufficiently to cause bonding and cools the resultant composite structure 10 to allow further handling thereof. The composite structure 10 is then wound onto storage roll 46. Composite material 10 is then moved to storage roll 34, the first film sheet 11 at storage roll 40 is replaced with second film sheet 14, and the process is repeated to adhere the second film sheet 14 to the composite material 10. Composite material 10 is then moved to storage roll 34, the second film sheet 14 at storage roll 40 is replaced with a roll of the metallic layer 17, and the process is repeated to adhere the metallic layer 17 to the composite material 10. Once the composite material 10 is formed, the adhesive and release liner 25 are optionally applied using conventional techniques.

The heat supplied to first and second films, 11 and 14, from hot roller 38 is sufficient to cause the films, 11 and 14, and foam 12 to bond but preferably without melting either the films or the foam. Excess heat from hot roller 38 can result in the complete or partial collapse in the cells of foam layer 12.

In order to provide second film 14 with extended region 19, the second film 14 is preferably wider than foam layer 12 so that edge 18 of the second film 14 extends beyond a corresponding edge 20 of the foam layer 12. The widths of both the foam layer 12 and second film 14 may range, for example, between about 20 and about 200 inches. The amount that edge 18 of second film 14 extends beyond corresponding edge 20 of foam layer 12 is not critical and may be any desired amount, e.g., between about 1 and about 10 inches. Thus, if the width of foam layer 12 is 60 inches, for example, the width of second film 14 may be 64 inches so that the extended region is 4 inches in width.

The present invention also contemplates one or more additional layers being added to the composite materials described above. The additional layers are preferably comprised of supplemental film layers, supplemental metallic layers, or combinations thereof. When present, the additional layers can be positioned in any of a variety of configurations, including adjacent one of the other films, foam layers, and/or metallic layers.

These and other aspects and advantages of the invention may be further understood by reference to the following examples, which are provided for illustrative purposes only and are not intended in any way to be limiting.

EXAMPLES

For each of the examples below, polyolefin foam sheets were made by blending, in a tandem extruder, LDPE resin having a density of 0.918 g/cc and a melt index of 2 g/10 min., talc, a mixture containing glycerol monostearate and ethanolamide, and butane as a blowing agent. The mixture was extruded out of an annular die, whereupon it expanded into a foam tube and the tube was slit to form a sheet. The resultant foam sheet had a thickness of about 0.075 inch and a density of about 2 pounds/ft$^3$ (pcf), unless otherwise specified.

Example 1

A multi-layer metal foil laminate (Example 1) having a thickness of 0.0044 inches was fabricated with a structure of BOPP/LDPE/aluminum foil/EVA. The foil laminate was prepared by a combination of blown film and extrusion lamination processes. The BOPP layer, LDPE layer, aluminum foil, and EVA layer had thicknesses of 0.0009 inches, 0.00104 inches, 0.0003 inches, and 0.0022 inches, respectively.

The foil laminate was heat laminated to one surface of the foam sheet, described above, by contacting the foil laminate with a heated roller maintained at about 440° F. and then pressing the metallized film and foam sheet together between a heated roller and a rubber roller, as described above in connection with FIG. 5.

For comparison purposes, Comparative Example A was also prepared. Comparative Example A was formed from a 0.002 inch thick HDPE film sheet that was laminated to one surface of the foam sheet described above. The HDPE film and foam sheet were heat laminated together by contacting the HDPE film with a heated roller maintained at 380° F. and then pressing the film and foam sheet together between a heated roller and a rubber roller, as described above with reference to FIG. 5.

Example 1 and Comparative Example A were tested for water vapor transmission rate (WVTR) in accordance with ASTM F 1249-90. The results are summarized in Table 1.

TABLE 1

| Sample | WVTR (g/100 inch$^2$/24 hrs at 100° F. and 90% relative humidity) | % Improvement over Comp. Ex. A |
|---|---|---|
| Ex. 1 | <0.010 | 94.7% |
| Comp. Ex. A | 0.187 | N/A |

Example 1 and Comparative Example A were also tested for sound transmission loss values in accordance with SAE J1400. The test procedure conformed to that specified by SAE as being the recommended practice for the "Laboratory Measurement of Sound Barrier Performance of Automotive Materials and Assemblies." The results are summarized in Table 2.

TABLE 2

| Frequency, Hz | Sound Transmission Loss (dB) | | Improvement over Comp. Ex. A (dB) |
|---|---|---|---|
| | Ex. 1 | Comp. Ex. A | |
| 2000 | 3.1 | 0.3 | +2.8 |
| 2500 | 4.6 | 1.7 | +2.9 |
| 3150 | 6.9 | 3.7 | +3.2 |
| 4000 | 8.2 | 5.2 | +3.0 |
| 5000 | 9.9 | 7.1 | +2.8 |
| 6300 | 11.0 | 7.9 | +3.1 |
| 8000 | 11.7 | 8.9 | +2.8 |

As shown by the data of Tables 1 and 2, Example 1 exhibits a combination of improved vapor barrier and improved sound barrier properties over Comparative Example A. The BOPP layer is expected to contribute to the good moisture barrier properties of the composite material, while also giving the composite material a suitable degree of stiffness. Additionally, the aluminum foil is expected to offer high reflectivity with good insulation characteristics. The EVA layer is expected to act as a sealant layer for thermal insulation. The aluminum foil was placed between the polymer layers to reduce corrosion.

Example 2

A composite material (Example 2) with a metal foil laminate having a LDPE/aluminum foil layer was also prepared and tested. Example 2 was prepared by a combination of blown film and extrusion lamination processes. The LDPE layer and aluminum foil layer had thicknesses of 0.0015 inches and 0.0005 inches, respectively. Example 2 was tested for water vapor transmission rate (WVTR) in accordance with ASTM F 1249-90 and compared to Comparative Example A (described above). The result are summarized in Table 3.

TABLE 3

| Sample | WVTR (g/100 inch²/24 hrs at 100° F. and 90% relative humidity) | % Improvement over Comp. Ex. A |
|---|---|---|
| Ex. 2 | <0.010 | 94.7% |
| Comp. Ex. A | 0.187 | N/A |

Example 2 was also tested for sound transmission loss values in accordance with SAE J1400. The results are summarized in Table 4.

TABLE 4

| | Sound Transmission Loss (dB) | | Improvement over |
|---|---|---|---|
| Frequency, Hz | Ex. 2 | Comp. Ex. A | Comp. Ex. A (dB) |
| 2000 | 1.0 | 0.3 | +0.7 |
| 2500 | 2.5 | 1.7 | +0.8 |
| 3150 | 4.4 | 3.7 | +0.7 |
| 4000 | 5.9 | 5.2 | +0.7 |
| 5000 | 7.6 | 7.1 | +0.6 |
| 6300 | 8.4 | 7.9 | +0.5 |
| 8000 | 9.2 | 8.9 | +0.3 |

The reflectivity and emissivity of Example 2 were also determined. The reflectivity was determined in accordance with ASTM C1371 to be 97%. Reflectivity is a measure of radiant energy that is reflected by the surface of a material without turning into conduction. The emissivity of Example 2 was determined according to ASTM C1371 to be 0.03. Emissivity is a measure of radiant energy passing through the surface of a material.

The data of Tables 3 and 4, as well as the reflectivity and emissivity measurements on Example 2, show that Example 2 provides improved WVTR and sound transmission performance as compared to Comparative Example A. In addition, the LDPE/aluminium foil combination of Example 1 provides high reflectivity with good insulation characteristics. The LDPE layer is also expected to provide a suitable degree of stiffness and to contribute to the moisture barrier properties of the composite material.

Example 3

In addition, a composite material (Example 3) with a metal foil laminate having a PET/LDPE/aluminum foil/EVA structure was prepared and tested. Example 3 was prepared by as described above in connection with Example 1, except that the foam layer used had a density of 3 pcf. The PET, LDPE, aluminum foil, and EVA layers had thicknesses of 0.0009 inches, 0.00104 inches, 0.0003 inches, and 0.0022 inches, respectively. The resulting composite material, Example 3, was tested for water vapor transmission rate (WVTR) in accordance with ASTM F 1249-90 and compared Comparative Example A (described above). The results are summarized in Table 5.

TABLE 5

| Sample | WVTR (g/100 inch²/24 hrs at 100° F. and 90% relative humidity) | % Improvement over Comp. Ex. A |
|---|---|---|
| Ex. 3 | <0.010 | 94.7% |
| Comp. Ex. A | 0.187 | N/A |

Example 3 was also tested for sound transmission loss values in accordance with SAE J1400. The results are summarized in Table 6.

TABLE 6

| | Sound Transmission Loss (dB) | | Improvement over |
|---|---|---|---|
| Frequency, Hz | Ex. 3 | Comp. Ex. A | Comp. Ex. A (dB) |
| 1000 | 1.20 | (No loss) | +1.2 |
| 1250 | 3.20 | (No loss) | +3.2 |
| 1600 | 5.10 | (No loss) | +5.1 |
| 2000 | 7.5 | 0.3 | +7.2 |
| 2500 | 8.8 | 1.7 | +7.1 |
| 3150 | 9.9 | 3.7 | +6.2 |
| 4000 | 11.8 | 5.2 | +6.6 |
| 5000 | 13.7 | 7.1 | +6.6 |
| 6300 | 13.3 | 7.9 | +5.4 |
| 8000 | 13.3 | 8.9 | +4.4 |

Example 3 was also tested for tensile strength in accordance with ASTM D624-91. Tensile strength is the greatest longitudinal stress that a material can bear without tearing. The results obtained in the machine direct (MD) and the cross-machine direction (CMD) are given in Tables 7 and 8.

TABLE 7

| Sample | Tensile Strength MD (lbf/inch²) | % Improvement over Comp. Ex. A |
|---|---|---|
| Ex. 3 | 271.5 | 37.6% |
| Comp. Ex. A | 169.2 | N/A |

TABLE 8

| Sample | Tensile Strength CMD (lbf/inch²) | % Improvement over Comp. Ex. A |
|---|---|---|
| Ex. 3 | 274.6 | 60.2% |
| Comp. Ex. A | 109.4 | N/A |

As shown by the data of Tables 5–8, Example 3 exhibited improved tensile strength properties in both the MD and CMD directions, as compared to Comparative Example A. Unlike Comparative Example A, Example 3 exhibited balanced tensile strength properties in both the MD and CMD directions. In addition, Example 3 provided better moisture barrier and sound transmission loss properties than Comparative Example A. The PET layer was added to provide the composite material with a sufficient degree of stiffness, while the aluminum foil layer was used for its excellent moisture barrier and sound barrier properties. The EVA layer was used as a sealant layer and for thermal insulation.

Example 4

Composite materials were also prepared by laminating a 0.0005 inch thick HDPE layer to a surface of the foam layer opposite the metallic layer of the composite materials of Examples 1, 2, and 3. For example, the composite material of Example 4 was prepared by laminating the HDPE layer to the composite material of Example 2. Example 4 was tested for tensile strength in accordance with ASTM D624-91. The results obtained in the MD and CMD directions are given in Tables 9 and 10.

TABLE 9

| Sample | Tensile Strength MD (lbf/inch$^2$) | % Improvement over Ex. 2 |
|---|---|---|
| Ex. 4 | 152.8 | 15.4% |
| Ex. 2 | 132.4 | N/A |

TABLE 10

| Sample | Tensile Strength CMD (lbf/inch$^2$) | % Improvement over Ex. 2 |
|---|---|---|
| Ex. 4 | 118.6 | 26.9% |
| Ex. 2 | 93.4 | N/A |

The data of Tables 7 and 8 show significant improvement in tensile strength properties when the composite material of Example 2 is laminated with the HDPE layer, as in Example 4.

Examples 5 and 6

Metalized films were also prepared and tested (Examples 5 and 6). The metalized films were prepared using vacuum metallizing processes to deposit an aluminum layer having a thickness of 150 Å onto polyester films. Polyester films having thicknesses of 0.00215 inches and 0.00206 inches were used for Examples 5 and 6, respectively. Examples 5 and 6 were tested for water vapor transmission rate (WVTR) in accordance with ASTM F 1249-90. For comparison purposes, a 0.00205 inch thick HDPE film (Comp. Ex. B) was also tested. The results are summarized in Table 11.

TABLE 11

| Sample | WVTR (g/100 inch$^2$/24 hrs at 100° F. and 90% relative humidity) | % Improvement over Comp. Ex. B |
|---|---|---|
| Ex. 5 | 0.07 | 65% |
| Ex. 6 | 0.08 | 60% |
| Comp. Ex. B | 0.20 | N/A |

The data of Table 11 shows that Examples 5 and 6 provide significantly improved moisture barrier properties as compared to Comparative Example B.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A composite material comprising:
   a. a foam layer comprising polyolefin;
   b. a first film operatively associated with said foam layer; and
   c. at least one metallic layer operatively associated with at least one of said foam layer and said first film;
   wherein at least one edge of said first film extends beyond a corresponding edge of said foam layer.

2. The composite material of claim 1 wherein said metallic layer comprises a metallized film.

3. The composite material of claim 1 wherein said metallic layer comprises a foil laminate.

4. The composite material of claim 3 wherein said foil laminate comprises a multilayer structure.

5. The composite material of claim 4 wherein said foil laminate comprises a metal foil and a first coating adjacent a first surface of said metal.

6. The composite material of claim 5 wherein said foil laminate further comprises a second coating adjacent a second surface of said metal foil.

7. The composite material of claim 1 wherein said metallic layer comprises a corrosion resistant coating.

8. The composite material of claim 1 wherein said metallic layer comprises a corrosion resistant additive.

9. The composite material of claim 1 wherein said metallic layer is disposed generally adjacent to said foam layer.

10. The composite material of claim 9 wherein said metallic layer is heat laminated to said foam layer.

11. The composite material of claim 9 wherein said metallic layer is bonded to said foam layer.

12. The composite material of claim 1 wherein said metallic layer is disposed generally adjacent to said film.

13. The composite material of claim 12 wherein said metallic layer is heat laminated to said film.

14. The composite material of claim 12 wherein said metallic layer is bonded to said film.

15. The composite material of claim 1 wherein said metallic layer is disposed generally between said foam layer and said film.

16. The composite material of claim 1 wherein said foam layer has a thickness of between about 0.001 inches and about 2 inches.

17. The composite material of claim 1 wherein said film has a thickness of between about 0.001 inches and about 0.008 inches.

18. The composite material of claim 1 wherein said film comprises polyolefin.

19. The composite material of claim 1 further comprising an adhesive layer positioned along at least a portion of said at least one edge of said film that extends beyond the corresponding edge of said foam layer.

20. A composite flooring material comprising:
   a. a foam layer comprising a polyolefin;
   b. a first film adhered to a first surface of the foam layer;
   c. a second film adhered to a second surface of the foam layer, wherein at least one edge of said second film extends beyond a corresponding edge of the foam layer; and
   d. a metallic layer operatively associated with at least one of said foam layer, said first film, and said second film.

21. A composite flooring material comprising:
   a. a foam layer comprising a polyolefin; and
   b. a metallic layer operatively associated with said foam layer, wherein at least one edge of said metallic layer extends beyond a corresponding edge of the foam layer.

22. The composite material of claim 21 wherein said metallic layer comprises a corrosion resistant coating.

23. The composite material of claim 21 wherein said metallic layer comprises a corrosion resistant additive.

24. A method for making a composite material comprising the steps of:
   a. operatively associating a film to surface of a foam layer such that at least one edge of said film extends beyond a corresponding edge of said foam layer; and b. operatively associating a metallic layer to at least one of said film and said foam layer.

25. The method of claim 24 wherein said metallic layer is heat laminated to said film.

26. The method of claim 24 wherein said metallic layer is heat laminated to said foam layer.

27. The methods of claim 24 wherein said metallic layer is bonded to said film.

28. The methods of claim 24 wherein said metallic layer is bonded to said foam layer.

* * * * *